UNITED STATES PATENT OFFICE.

WILLIAM CULLEN HORNE, OF BEXLEY, COUNTY OF KENT, ENGLAND.

CRAYON.

SPECIFICATION forming part of Letters Patent No. 257,706, dated May 9, 1882.

Application filed October 8, 1881. (No specimens.) Patented in England February 25, 1881.

*To all whom it may concern:*

Be it known that I, WILLIAM CULLEN HORNE, of Bexley, in the county of Kent, England, have invented a certain new and useful Improvement in Crayons, Pencils, and Chalks for Writing, Drawing, and Marking, (for which I obtained British Letters Patent No. 805, dated February 25, 1881,) of which the following is a specification.

According to this invention phosphorescent substances are used in the manufacture or preparation of crayons, pencils, and writing-chalk, which are thereby made to produce luminous marks—that is to say, marks which, after exposure to light, will emit light, so as to be visible in a dark place. For this purpose I incorporate into crayons, pencils, and writing-chalk a phosphorescent substance or substances such as will, after exposure to light, remain phosphorescent some hours. The phosphorescent substance so used may be luminous powder, such as is used in the manufacture of luminous paint according to the invention for which English Letters Patent No. 4,152, dated November 7, 1877, were granted to the late W. H. Balmain; but I do not restrict myself to this substance.

According to another modification crayons or pencils may be made of phosphorescent substance or substances in the form of powder, mixed with a vehicle to hold the same together. Such vehicle may be in the form of a jelly and variously composed. A sufficient quantity of the vehicle is worked into a paste with the phosphorescent substance or substances. Also, with the phosphorescent substance there may be mixed a proportion of clay. The phosphorescent powder, having been worked into a paste with the vehicle, is rolled into slabs or sticks and baked in a slow oven or otherwise dried.

A vehicle having an oleaginous base may be used to mix with the phosphorescent substances, so as to form a water-proof luminous crayon or pencil.

In carrying out my invention I generally place the phosphorescent substance in water for twenty-four hours, that the lime of which it is chiefly composed may slake. Then, stirring the water that holds the same, I await a short interval, so as to allow the coarser particles to subside before pouring off the supernatant water still turbid into another vessel, in which I allow the suspended powder time to settle. This deposit or precipitate may be dried in molds, and so formed into lumps or pencils of luminous writing-chalk, the necessary cohesiveness having been obtained by the water, which in this method of carrying out my invention is the only vehicle employed; or I may dry the product of elutriating the sulphide of calcium and grind it into a fine powder. I take of such powder sixty parts, of finely-powdered pipe-clay ten parts, of curd-soap ten parts, of gum-arabic two parts, and by boiling the said ingredients in water intimately mingle the same. When the water has evaporated sufficiently to leave a paste the same can be molded or rolled into shape and dried in the manner of ordinary crayons. According to another method of carrying out my invention, I take spermaceti and make it into an emulsion with boiling water, into which I then stir the luminous or phosphorescent powder until a thick paste is formed, which can be molded and dried into shape. I also find that rice-water, sweet ale, white wax, Russian tallow, and sugar-candy are useful materials or vehicles to carry or to hold the luminous powder together, so that it can be molded into shapes suitable to write with, either alone or protected in the groove or tube of a pencil-holder.

It will be evident crayons, pencils, and writing-chalk manufactured according to my invention are applicable to a variety of useful purposes, among which, as example, I may mention writing numbers and words on railway-trucks, casks, and packages, especially those that contain inflammable or explosive goods, and which on that account cannot safely be manipulated by the aid of ordinary artificial light, writing the addresses of parcels, and also for military and naval purposes for the production of landmarks visible during the night for defining the position of dangerous obstacles, such as scaffold-poles of buildings in course of erection, and many other purposes.

What I claim as my invention, and desire to secure by Letters Patent, is—

A crayon, pencil, or writing-chalk composed of a luminous substance and a base or vehicle, substantially as herein described.

WILLIAM CULLEN HORNE.

Witnesses:
E. T. LEWIS,
H. YOUNG.